United States Patent
Cornell

[15] 3,658,413
[45] Apr. 25, 1972

[54] DISPLAY DEVICES

[72] Inventor: Robert G. Cornell, 111 Boardman Street, Norfolk, Mass. 02056

[22] Filed: Apr. 8, 1970

[21] Appl. No.: 26,554

[52] U.S. Cl. .............................. 350/235, 40/152, 350/112, 350/239
[51] Int. Cl. ....................................................G02b 27/02
[58] Field of Search ............... 250/102, 103, 286, 287, 235, 250/239; 272/8; 40/77.4, 77.8, 125, 152, 156

[56] References Cited

UNITED STATES PATENTS

| | | | |
|---|---|---|---|
| 540,768 | 6/1895 | Western | 350/286 |
| 3,374,044 | 3/1968 | Benson | 350/102 |
| 1,090,278 | 3/1914 | Coates | 350/286 |
| 1,473,939 | 11/1923 | Russell | 272/8 |
| 2,572,454 | 10/1951 | Down et al. | 40/152 |
| 2,521,558 | 9/1950 | Alvarez | 40/152 |

*Primary Examiner*—David Schonberg
*Assistant Examiner*—Michael J. Tokar
*Attorney*—Edgar H. Kent

[57] ABSTRACT

A display device for photographs and like objects has means for supporting at least three of the objects for viewing around an axis about which the device is turnable to bring each of the objects successively into a given viewing position. The means supports the objects generally facing the axis and at an incline outwardly from the axis from the base toward the top thereof and also provides a transparent viewing surface spaced opposite each of the objects successively when turned into the viewing position.

10 Claims, 3 Drawing Figures

PATENTED APR 25 1972 3,658,413

DISPLAY DEVICES

This invention relates to display devices generally and in particular to a new and improved display device useful for selectively viewing one or more of a number of pictures, or the like, mounted thereon.

Display devices for a plurality of pictures generally either employ a number of individual frames joined together vertically at their adjacent edges or mounting blocks, often cube shaped, which are rotatably mounted and have pictures facing outwardly mounted on the surfaces of the blocks or in recesses in the blocks and held in place by transparent slabs mounted in the recesses. Although such devices have been ornamental and useful in displaying pictures, they have been in common use for so long that they have lost much of their appeal. In addition, although such devices have often protected pictures from dust and the like, they have done little to enhance or emphasize the effect of the pictures other than to render them visible for observation.

Accordingly, it is an object of the present invention to provide an improved display device for photographs and the like which permits selective viewing of a number of photographs, or other objects, with apparatus that is simple, reliable, and inexpensive.

Another object of the invention is to provide such a device the geometrical configuration of which may be modified to accommodate different numbers of photographs.

Still another object of the invention is to provide such a device which may incorporate transparent blocks of material, having a variety of geometrical shapes, to provide very striking visual effects and to enhance the beauty of the photographs or objects displayed thereby.

Yet another object of the invention is to provide such a device which may be supported with a variety of supporting structures.

In one aspect the invention features a display device for photographs and like objects having means for supporting at least three of the objects for viewing around an axis about which the device is turnable to bring each of the objects successively into a given viewing position. The means supports the objects generally facing the axis and at an incline outwardly from the axis from the base toward the top thereof and provides a transparent viewing surface spaced opposite each of the objects successively when turned into the viewing position. In preferred embodiments the means supports the objects substantially symmetrically about the axis; each supported object is disposed substantially in a plane and the viewing surface, through which the supported object is viewed when it is in the viewing position, is substantially parallel to the plane of the supported object or the viewing surface is convex toward the view point from such a plane; the viewing surface for each of the objects is a different surface of a polyhedron of transparent material; the supporting means includes means for supporting each object with its face to be viewed facing inwardly of the polyhedron; the polyhedron is a cube; the device includes a base and means rotatably mounting the supporting means on the base; the angle of inclination is between about 20° and 40°; and the means for supporting at least three of the objects includes means for supporting each object with its surface to be viewed substantially co-planar with a surface of a polyhedron of transparent material.

In another aspect the invention features a display device for photographs and like objects having means for supporting at least three of the objects for viewing around an axis about which the device is turnable to bring each of the objects successively into a given viewing position. The supported objects are each disposed substantially in a plane, the planes define at least partially the sides of a polyhedron, and the axis extends through a point substantially at a corner of a polyhedron. In a preferred embodiment the polyhedron is a cube.

Other objects, features, and advantages will become apparent from the following description of a preferred embodiment of the invention, taken together with the attached drawings thereof, in which.

Figures 1, 2, 3:
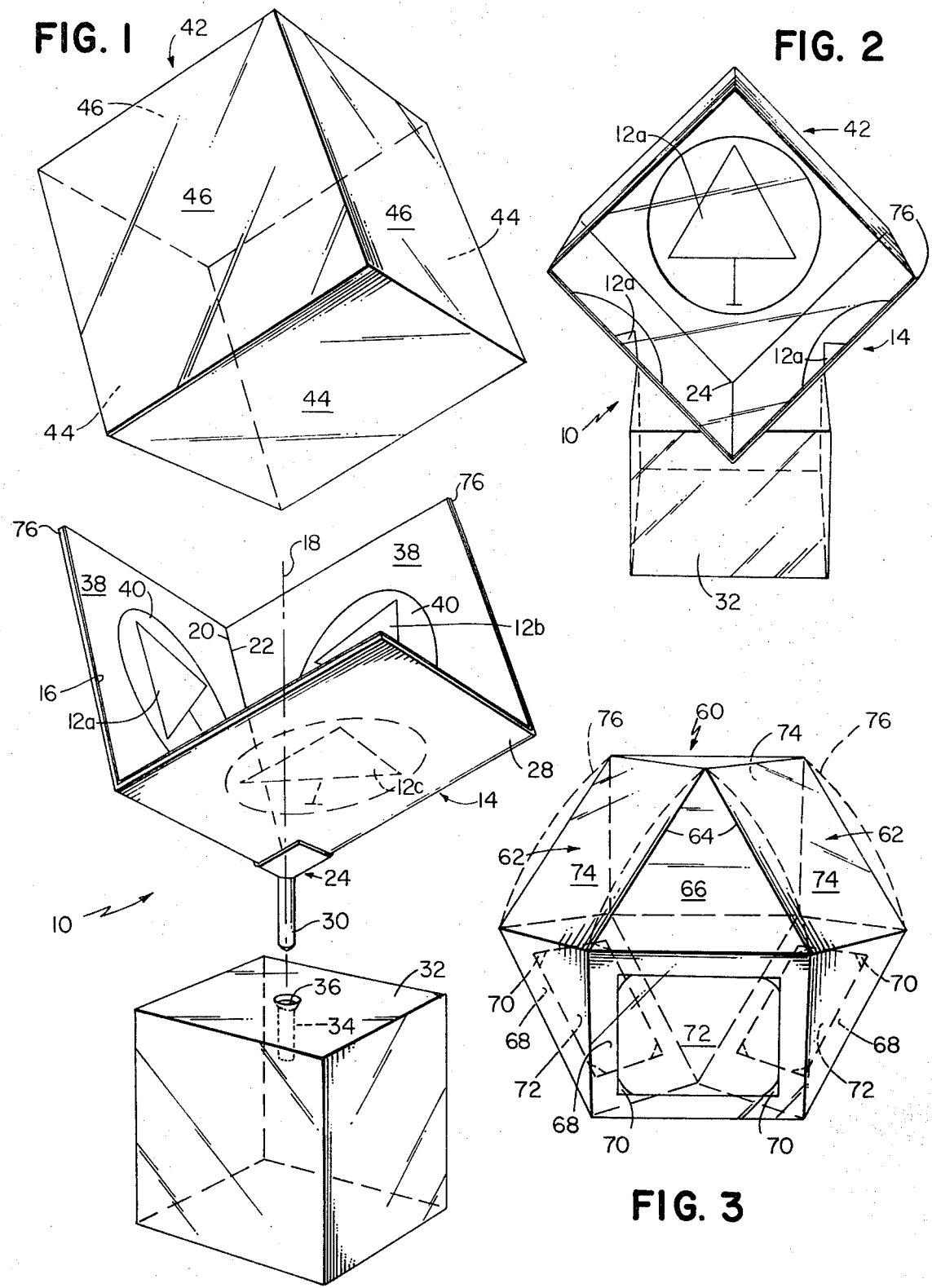
FIG. 1 is an exploded perspective view of a display device constructed in accordance with the invention.
FIG. 2 is a view of an assembled device positioned for viewing one of the photographs.
FIG. 3 is a perspective view of an alternate embodiment of the invention.

Referring to FIGS. 1 and 2, there is shown a device, generally designated 10, for displaying three photographs 12a, b, and c, having a supporting structure or holder 14 for holding the photographs. Structure 14, which may be constructed of any suitable material such as metal or plastic, has three square planar inner surfaces 16, disposed in planes lying at right angles to each other symmetrically about an axis 18, and joined together at their adjacent edges 20, 22, to define a corner 24 of a cube. Each inner surface 16 has a corresponding outer surface 28. Structure 14 has a cylindrical pin 30 suitably secured to and depending from the outside of corner 24 along the axis of symmetry 18 and is arranged to be rotated about axis 18 on pin 30. A cube shaped block 32 of transparent material is provided with a vertical tubular metallic member 34, having an opening 36 in the top thereof, in which pin 30 is arranged to be seated and rotated. Photographs 12a, b and c are mounted on surface 16 in any suitable manner, such as being supported on their edges behind paper frames 38 having circular openings 40 therein.

A second cube 42, constructed of transparent material, has six surfaces, designated mounting surfaces 44 and viewing surfaces 46 and having substantially the same planar dimensions as surfaces 16 and is arranged to be mounted between and supported by surfaces 16 after photographs 12a, b and c have been mounted on surfaces 16 facing inwardly toward axis 18. Mounting surfaces 44 are the three adjacent surfaces on cube 42 behind which photographs 12 are disposed when cube 42 is in place on structure 14 and viewing surfaces 46 are the three adjacent surfaces on cube 42 opposite mounting surfaces 44.

For assembly photographs 12a, b, and c are mounted facing axis 18 on surfaces 16 behind frames 38 with the portions to be viewed exposed within openings 40. Pin 30 is inserted in member 34 and one corner of cube 42 placed between and supported by surfaces 16.

Advantageously, the holder 14 and photographs 12a, b, c are viewed (FIG. 2) from a viewing point such that the viewer is not conscious of outer surfaces 28. As holder 14 is rotated about axis 18 on pin 30, the three viewing surfaces 46 successively are presented to the viewing point. When any one viewing surface 46 comes into view, the photograph 12a, b or c disposed behind the opposite mounting surface 44 is clearly visible through cube 42 and the opening 40 in a frame 38. In addition, if the viewing point is altered slightly either horizontally or vertically or, alternatively, if holder 14 is rotated slightly in either direction, the other surfaces 44 and 46 provide a mirrored effect and display a reflection of the photograph 12a, b or c viewed through the generally facing viewing surface 46. At the same time, the two mounting surfaces 44 disposed adjacent the other two photographs, by reflecting the light shining onto cube 42 prevent those other photographs from being viewed through the viewing surface 46 which faces the viewing point. When holder 14 is rotated further, a new viewing surface 46 and another photograph disposed behind the corresponding mounting surface 44 come into view and the same mirrored effect takes place. If cube 42 is removed from holder 14 when a photograph is in view, the same photograph together with all or portions of the other photographs, depending upon the magnitude of the angle from the horizontal at which the device is viewed, become visible. When cube 42 is replaced not only are the other two photographs removed from view but the photograph behind the viewing surface 46 is apparently lifted somewhat toward the viewing surface 46 which is being viewed and stands out substantially more than it did with the cube 42 removed.

Another embodiment of the invention is shown in FIG. 3. In this embodiment there is shown a 14-sided polyhedron 60 constructed from a transparent cube-shaped block of material. As shown, the cube has had its corners cut off to define six square surfaces generally designated 62, with sides 64 somewhat smaller than those of the cube and rotated 45° from the orientation of the six surfaces of the cube, and eight equilateral triangles 66, each disposed between and joining the sides 64 of the three adjacent square surfaces 62. In this embodiment three of square surfaces 62 are mounting surfaces 68 and have disposed thereon four mounting corners 70 for photographs 72 facing inwardly, and opposite mounting surfaces 68 three square viewing surfaces 74. The vertical axis of symmetry is a diagonal of the cube extending through two of its cut-away corners, the triangular face left by cutting away one of which forming the base.

When the polyhedron 60 is rotated or the viewing point moved sufficiently, photographs 72 will successively come into view through the opposite viewing surface 74 while the reflective property of the other surfaces 68 prevent the other photographs 72 from being viewed and surfaces 68 and 74 reflect the particular photograph 72 when polyhedron 60 is between one of the straight-on positions for viewing a photograph 72.

In both of the described embodiments the photographs are inclined from an axis of symmetry about which they may be rotated to bring the photographs successively into view through a viewing surface which is spaced apart from and opposite a photograph. As is apparent, if the angle of inclination away from the axis becomes very small, the photographs will begin to face each other too much and become extremely difficult to view. On the other hand, if the angle of inclination becomes unreasonably large, more than one or even all of the photographs will come into view at one time and the ability of the device to display pictures successively and to employ the reflective properties of the surfaces of the transparent material will be lost. Thus, there exists a range of angles of inclination which is preferable for a display device of the type described.

In the first described embodiment, since the photographs are disposed on surfaces which correspond to three adjacent surfaces on a cube with the axis of symmetry 18 corresponding to a diagonal of the cube, the angle of inclination of the sides of the axis is approximately 35°. The angle of inclination of the mounting surfaces 68 of the FIG. 3 embodiment is the same since they are surfaces of a cube with the vertical axis of symmetry a diagonal of the cube.

Other geometrical configurations which are adaptable for use in a display device of the type described may have different angles of inclination. For example, five pentagonal sides of a portion of a dodecahedron, spaced around a sixth pentagonal side used as a base, may be employed as mounting surfaces and are inclined from an axis of symmetry perpendicular to and through the center of the base at an angle of approximately 38°. Five sides of a portion of an icosahedron which come together at a point are inclined from an axis of symmetry through the point at an angle of approximately 24°. Where the angle of inclination is substantially larger than 38°, more than one photograph at one time generally is in view. Where the angle is substantially smaller than 24°, it becomes difficult to view any of the objects. A preferred range of angles is between about 20° and about 40°.

It will be appreciated that many variations of the disclosed embodiments are possible. Many types of decorative bases other than the transparent cube 32 may be used for mounting holder 14, which, in fact, need not be rotatably mounted. In addition, it may be desirable to mount holder 14 for tilting forward and backward or to either side to accommodate changes in viewing position, either independently of or in addition to rotation. The structure of holder 14 may be varied considerably, as is apparent from the second embodiment, and of course need not be a portion of a polyhedron, as long as the holder 14 supports the photographs in a proper orientation. Furthermore, the structure of block 42 may be altered considerably, if in fact a separate block is used at all. For example, the block may be hollow or have curved viewing surfaces convex toward the viewer (see dotted surfaces 76 in FIG. 3) providing magnification of some or all of the objects or may be constructed of colored transparent material to achieve a variety of pleasing visual effects.

What is claimed is:

1. A display device for photographs and like indicia carrying objects including:
   means for supporting at least three of said objects for viewing around an axis about which said device is turnable to bring each of said objects successively into a given viewing position,
   said means supporting said objects with the indicia generally facing said axis and at an incline outwardly from said axis from the base toward the top thereof,
   said means also providing a transparent viewing surface spaced over and spaced opposite each of said objects when turned successively into said viewing position.

2. A display device according to claim 1 wherein said means supports said objects substantially symmetrically about said axis.

3. A display device according to claim 1 wherein each supported object is disposed substantially in a plane and said viewing surface is substantially parallel to said plane of said supported object through which it is viewed when said object is in said viewing position.

4. A display device according to claim 1 wherein said viewing surface is convex toward the view point.

5. A display device according to claim 1 wherein said viewing surface for each of said objects is a different surface of a polyhedron of transparent material.

6. A display device according to claim 5 wherein said supporting means includes means for supporting each object with its face to be viewed facing inwardly of said polyhedron.

7. A display device according to claim 6 wherein said polyhedron is a cube.

8. A display device according to claim 1 which includes a base and means rotatably mounting said supporting means on said base.

9. A display device according to claim 1 wherein the angle of said inclination is between about 20° and 40°.

10. A display device according to claim 1 wherein said means comprises means for supporting each said object with its surface to be viewed substantially co-planar with a surface of a polyhedron of transparent material.

* * * * *